United States Patent [19]

Tinebor et al.

[11] Patent Number: 4,546,301

[45] Date of Patent: Oct. 8, 1985

[54] CIRCUIT AND METHOD FOR CONTROLLING AN ALTERNATING OR THREE-PHASE CURRENT MOTOR

[75] Inventors: Manfred Tinebor; Gustav Matthies; Heinz-Dietmar Karl, all of Barntrup, Fed. Rep. of Germany

[73] Assignee: Maschinenfabrik Stahlkontor Weserlenze GmbH & Co., Fed. Rep. of Germany

[21] Appl. No.: 584,970

[22] Filed: Mar. 1, 1984

[30] Foreign Application Priority Data

Mar. 4, 1983 [DE] Fed. Rep. of Germany ....... 3307623

[51] Int. Cl.[4] .............................................. H02P 5/40
[52] U.S. Cl. ..................... 318/798; 318/729; 318/806
[58] Field of Search ..................... 318/798, 806, 729

[56] References Cited

U.S. PATENT DOCUMENTS

| 3,612,971 | 10/1971 | Blaschke | 318/806 |
| 3,753,063 | 8/1973 | Graf | 318/806 |
| 4,291,264 | 9/1981 | Siemon | 318/729 |

Primary Examiner—David Smith, Jr.
Attorney, Agent, or Firm—Pollock, Vande Sande & Priddy

[57] ABSTRACT

A method and circuit for regulating an alternate or three-phase current motor, a pulse inverter with a capacitive direct current intermediate circuit is used through which the motor is supplied with a substantially constant voltage by means of electronic switches and corresponding antiparallel recovery diodes. For this purpose, the reactive motor current is measured for utilization in the feedback control system. To this end, the feedback current from the motor inductance to the capacitor of the intermediate circuit is measured and the value obtained is used to form a control signal for regulating the reactive current.

6 Claims, 3 Drawing Figures

CIRCUIT AND METHOD FOR CONTROLLING AN ALTERNATING OR THREE-PHASE CURRENT MOTOR

BACKGROUND OF THE INVENTION

The invention is concerned with a method and circuit for controlling an alternating or three-phase current motor.

It is known that variable three-phase current motors strive to achieve through variable frequency and voltage an airgap flow which is as constant as possible, whereby the machine is optimally energized under all operational conditions. Even though the airgap flow of the machine can, in principle, be calculated as a controlled variable, it is considerably difficult using known methods. In the so-called "field oriented control", the energization of the machine is determined directly by measuring the induction in the airgap. To accomplish this, measuring coils for the electric flux are placed into the grooves of the machine or sound probes are placed in the airgap.

Such efforts are usually not justifiable. Normally, it is sufficient to keep the ratio constant between the supply voltage U and the rotating field frequency f—the so-called U/f ratio—and to equalize the load related voltage drop at the stator resistance of the machine through current resistance compensation, the so-called I.R compensation. Such methods are, however, very inexact since, instead of vector addition, only a quantitative addition of the voltage drop at the apparent impedance of the machine is carried out. In addition, the resistance of the stator winding of the machine is very dependent on temperature; for this reason, the I.R compensation is only suitable for specific operational conditions.

This frequency results in excessive no-load current in the machine when disconnected from a load.

For this reason there are known procedures which determine and control the U/f ratio through other motor parameters in relation to the load. The German Disclosure Brief 26 15 744 describes a procedure for controlling the U/f ratio in which the voltage drop at the main inductance of the machine is determined automatically under all operational conditions through an arithmetic element from sensing the terminal voltage. The stator resistance of the machine is entered as a constant into the approximation formula used, which is electronically simulated in the computer. It is also necessary to determine the applicable power factor. In this method of control the temperature effect is not eliminated and a considerable effort is required to determine the power factor of the machine. The same basic disadvantages are inherent in another known control method in accordance with the German Disclosure Brief 28 06 535, which only proposes a simplification of the mathematical formula for determining the supply voltage.

A procedure for controlling or regulating the speed of a three-phase motor is known through the German Disclosure Brief 29 39 090 on which the circuit factor of the machine is to be optimized for all load moments. The load moment, as the guiding value for the feedback control system, can affect the voltage at the main inductance of the machine only indirectly, in which case the previously described disadvantages apply and, in addition, it becomes necessary to simulate empirically the interconnection between the two values.

SUMMARY OF THE INVENTION

The invention, therefore, provides apparatus and method wherein the reactive current of the motor can be determined immediately and used as a measurable variable through which the U/f ratio of the machine can be regulated, independent of load, to achieve constant, or nearly constant, energization.

The invention has the special advantage that the reactive current control makes a substantially constant energization of the machine directly possible, since the feedback current is a direct measure of motor energization. This current is also measurable through the diode current while power is supplied to the motor through the inverter with constant intermediate circuit voltage when, in addition to the reactive current, there are also recovery currents present in the respective diode current because of voltage transformation through the pulse-mode operation. Since the recovery current related to the voltage transformation does not flow simultaneously into the feedback current, the feedback current can be determined through timed interruption of the diode recovery current. Since it is also a fact that the recovery current which is a function of the voltage transformation does not flow simultaneously with the intermediate circuit current, the clocking signal for interrupting the diode recovery current can be derived from the pulsating supply current of the intermediate circuit.

In order to transform the pulsating data signal of the feedback current into a control signal which is directly proportional to the inductive reactive current of the machine, the clocked data signal is filtered and then the control signal is formed through division by a value which is proportional to the rotating field frequency. The ratio of the capacitive, measurable reactive current in the intermediate circuit to the inductive reactive current of the main inductance of the motor can be derived from the following power equation:

$$R_L = I_L^2 \omega L$$

Reactive power of the intermediate circuit voltage:

$$Q_C = \frac{I_C^2}{\omega C}$$

Both outputs must be equal and by equating them, it follows that:

$$I_L = I_C \cdot \frac{1}{\omega \sqrt{LC}}$$

The filtered data signal, therefore, only needs to be multiplied by a multiplication factor of $$\frac{1}{\omega \sqrt{LC}}$$

in order to obtain a control signal which is a direct function of the inductive reactive current of the machine.

The invention is further explained by the figures.

DESCRIPTION OF THE PREFERRED EMBODIMENT

Figure 1:
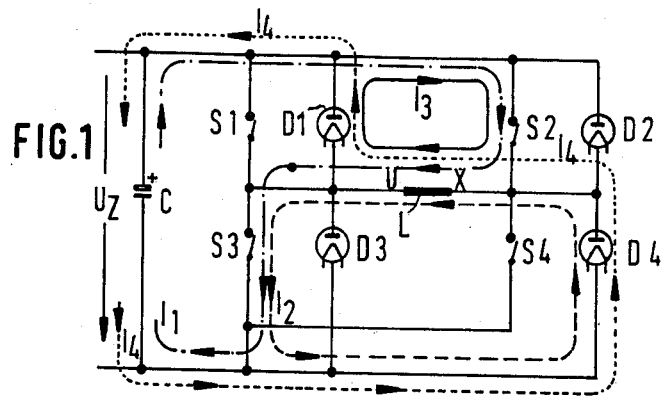
FIG. 1 is a circuit diagram of an alternate current motor supplied through a two-phase inverter.

The currents occurring in the pulse inverter for one of the two motor current directions are illustrated in FIG. 1. A two-phase inverter is shown only for the sake of clarity. The current flows are also valid in principle of multiphased direction modifications.

There are four different current branches for each direction of the motor current. These are switched in synchronization with the rotating field frequency f through the closing or opening of electronic switches S1 to S4, where these electronic switches S1 to S4 are controlled through a pulse width modulator which is not shown. Antiparallel to each of the switches S1 to S4 and diodes D1 to D4 through which the so-called recovery currents can shut themselves off.

If the switches S2 and S3 are closed, the current I1 is fed to the motor through the terminals U, X from the intermediate circuit voltage with the supply voltage $U_z$ which is kept constant or nearly constant. If the switch S2 is opened, a recovery current I2 flows through the diode D4. If the swtich S3 is opened, with the switch S2 closed, a recovery current I3 flows through the diode D1.

The motor has an inductance L, which draws its reactive current from the intermediate circuit. This reactive current of the motor is an alternate current between the motor inductance L and an intermediate circuit capacity C. For that reason there flows a so-called feedback current I4 from the motor to the intermediate circuit, simultaneously with the supply current I1, through the diodes D1 and D4. This feedback current is that part of the alternate current between the motor inductance and the intermediate circuit which flows with opposite polarity from the voltage fundamental wave through the capacity C of the intermediate circuit. The part of the alternate current which flows with the same polarity as the voltage fundamental wave is contained in the supply current I1. To determine the value of the reactive current, it suffices, however, merely to measure the feedback current I4 since, based on the 90° phase shift of the motor reactive current with regard to the ordinary voltage wave, the reactive current waves which occur with the same and with opposite polarity of the fundamental voltage waves, have the same value. There is, however, the problem of measuring only the actual feedback current I4, which flows in the current path of the supply current I1 as well as in the current paths of the recovery currents I2 and I3.

Figure 2:
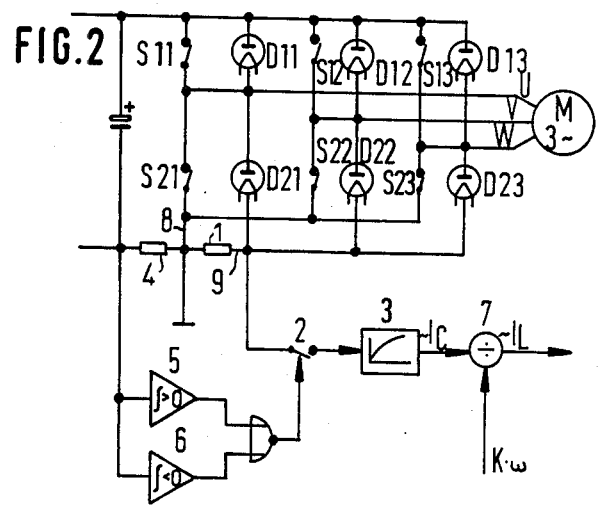
FIG. 2 is a circuit diagram of a three-phase motor controlled through a three-phase inverter by determination of the reactive current.

FIG. 2 shows circuitry for determining the feedback current I4, using the example of a bridge circuit for a three-phase inverter. This circuit has the electronic switches S11, S12 and S13 on the upper branch of the bridge to which the respective recovery diodes D11, D12 and D13 are connected antiparallel. The circuit has, in an analog way, the electronic switches S21–S23 and the antiparallel recovery diodes D21–D23 on the lower branch of the bridge. The measuring device for the feedback current I4 is shown only for the lower branch of the bridge. It is important here that the recovery diodes D21–D23 are connected to the appropriate pole of the direct voltage intermediate circuit through a connecting branch 9 which is separate from the connecting branch 8 of the electronic switches S21–S23.

The first current measuring device 1 is connected to the diode branch 9, which measures the diode current that is derived, as shown in FIG. 1, from the recovery current I2, I3 and from the feedback current I4. In order to measure only the feedback current I4, and not the recovery current I2, I3, the data signal formed by the device is clocked through an analog switch 2. Since the recovery current I2, I3 does not flow at the same time that the current I1 is flowing, the timing of the data signal through the analog switch 3 is derived from detecting the presence of the intermediate circuit current.

For this purpose, a current measuring device 4 is inserted into the intermediate circuit. Between the tap and the control input of the analog switch 2, through a connecting link, in such a way that it is open whenever the supply current I1 is not flowing and, thus, the respective diode recovery current is phased out.

Figure 3:
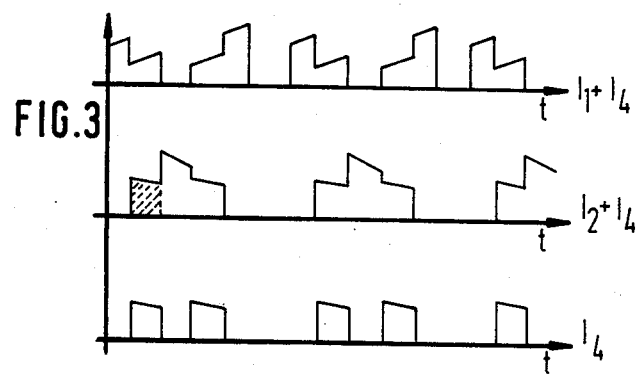
FIG. 3 illustrates the time sequence of several current pulses in the intermediate circuit, in the diode circuit, and the measured level.

To this end, FIG. 3 compares with one another the temporal dependence of the intermediate circuit current, which has been determined by the current measuring device 4; the diode current measured by the current measuring the device 1; and, the data signal at the load end of the analog switch 2. The current pulses which result from the sum of the supply current I1 and the feedback current I4 are illustrated in the upper plot. In the middle plot, it can be seen that, in comparison, there is a time shift for the diode current which consists, by way of example, of the recovery current I2 and the feedback current I4. During an overlapping time period, the recovery current consists only of the feedback current I4. This current is shown in the middle plot through diagonal lines at the left current pulse and is, consequently, analog to the data signal in the lower plot.

The output data signal of the analog switch 2 is sent to a signal amplifier 3 whose load end supplies a signal which is proportional to the capacitive reactive current of the direct voltage intermediate circuit. This signal is further divided, in accordance with an equation given earlier, by means of dividing element 7, by a value which is proportional to the rotating field frequency $\omega$. K, so that a signal is available to the reactive motor current. This signal is further utilized as a lead or control variable in the feedback control system of the three-phase or alternate current motor.

Thus, there is described with respect to one embodiment, a circuit and method for deriving the reactive current of a motor which can form the basis for controlling the U/f ratio of the machine. Those skilled in the art will recognize yet other embodiments described more particularly in the claims which follow.

What is claimed is:

1. A method for controlling the reactive current of an alternating current motor which is fed by voltages which are amplitude and frequency controlled by a direct voltage intermediate circuit and an inverter circuit having electronic switches and corresponding antiparallel recovery diodes providing feedback current from the motor inductance to a capacitor of said intermediate circuit, comprising:
   interrupting on a time basis the feedback current to develop a signal component proportional to the reactive current of the motor;
   measuring the magnitude of said signal component which is proportional to said reactive current;

generating a control signal from said measured magnitude which is directly proportional to said reactive current; and controlling the amplitude and frequency of voltages of said voltage fed to said motor with said inverter in response to said control signal.

2. The method in accordance with claim 1 wherein a timing signal for interrupting the recovery diode current is derived from sensing the supply current of the intermediate circuit.

3. The method in accordance with claim 1 further comprising filtering the signal of the measured magnitude and dividing the filtered signal by a value that is proportional to the motor rotating field frequency.

4. A circuit for regulating a motor which is supplied with a substantially constant voltage by a pulse inverter, said inverter having electronic switches and corresponding antiparallel recovery diodes associated with each pole of a capacitive direct current intermediate circuit comprising:

a first current measuring means connected between said diodes and said switches;

a second current measuring means connected between said switches and said intermediate circuit;

an analog switch having an input connected to a connection point defined by said diodes and said first measuring means, an output, and a control input;

comparator means having an input connected to a connection point defined by said second current measuring means and said intermediate circuit, and an output connected to said analog switch control input; whereby said analog switch produces an output signal proportional to the feedback current flowing between said motor and intermediate circuit for regulating said motor.

5. A circuit according to claim 4 further comprising a means connected to the output of the analog switch for dividing the output signal of the analog switch by a value which is proportional to the motor rotating field frequency.

6. A circuit according to claim 5 further comprising a measurement amplifier inserted between the analog switch and the means for dividing.

* * * * *